United States Patent [19]

Wilt et al.

[11] Patent Number: 4,658,141

[45] Date of Patent: Apr. 14, 1987

[54] INORGANIC SCINTILLATOR CRYSTAL HAVING A HIGHLY REFLECTIVE SURFACE

[75] Inventors: Michael C. Wilt, Solon; Bradley K. Utts, Oakwood Village; Michael L. Toth, Aurora, all of Ohio

[73] Assignee: Harshaw/Filtrol Partnership, Cleveland, Ohio

[21] Appl. No.: 596,479

[22] Filed: Apr. 3, 1984

[51] Int. Cl.[4] .................................................. G01T 1/20
[52] U.S. Cl. .............................. 250/361 R; 250/363 S; 250/368
[58] Field of Search ................... 250/361 R, 368, 370, 250/371, 363 R, 363 SR

[56] References Cited

U.S. PATENT DOCUMENTS

| | | | |
|---|---|---|---|
| 4,107,534 | 8/1978 | Piltingsrud | 250/368 |
| 4,110,621 | 8/1978 | Horn | 250/361 R |
| 4,220,860 | 9/1980 | Carlson et al. | 250/361 R |
| 4,267,453 | 5/1981 | Kieboom et al. | 250/368 |

FOREIGN PATENT DOCUMENTS 0194374 11/1982 Japan ..................................... 250/368

OTHER PUBLICATIONS

Eastman Kodak Company, *Kodak White Reflectance Standard*, 1980.
Eastman Kodak Company, *Kodak White Reflectance Coating*, 1980.
Nuclear Enterprises, Inc., *Accessories*.

*Primary Examiner*—Janice A. Howell
*Attorney, Agent, or Firm*—Harshaw/Filtrol Partnership

[57] ABSTRACT

Scintillators, and more particularly inorganic scintillation crystals such as cadmium tungstate, bismuth germanate, barium fluoride and calcium fluoride are coated with successive coatings of particulate materials such as barium sulfate and titanium dioxide to provide a highly reflective surface layer capable of providing internal reflection of scintillation events in the region of 200–700 nm. The reflective surface enhances the pulse height and resolution of the scintillator when coupled to a suitable detector such as a photomultiplier tube or a silicon photodiode.

10 Claims, No Drawings

INORGANIC SCINTILLATOR CRYSTAL HAVING A HIGHLY REFLECTIVE SURFACE

BACKGROUND OF THE INVENTION

This invention relates to scintillators and more particularly inorganic scintillation crystals of the type characterized as alkali metal halides and inorganic oxides. These crystals are noted for their ability to scintillate or emit pulses of light when exposed to ionizing radiation. When the crystals are optically coupled to a suitable detector, the scintillation events or pulses can be detected, measured and analyzed for the purpose of characterizing the amount or nature of the radiation energy to which the crystal is exposed.

Some desirable characteristics of inorganic halide and oxide scintillators are their high density for gamma ray stopping power, large pulse height or light output for detection for low energy interactions, and short decay time for rapid counting of scintillation events.

Pulses of light emitted during scintillation are detected by a device such as a photomultiplier tube (PMT) or a silicon photodiode. The effectiveness of the detector in seeing the light flashes within a crystal is dependent upon the number of flashes impinging on the detector. On the other hand, the flashes within the crystal move in random directions and may pass out of the crystal without being detected.

DISCUSSION OF THE PRIOR ART

It has been a common practice to surround a scintillation crystal with a reilective material in contact with all of the crystal surfaces except for the surface optically coupled to the detector. Typically, the crystal is placed in a housing with the space between the housing and crystal being filled with a finely divided reflective powder such as aluminum oxide or magnesium oxide. Alternatively it has been a common practice to wrap the crystal with a reflective substance in an effort to contain the scintillation events within the crystal until detected by the PMT or the diode. To be effective, the powder or the wrapping must be capable of reflecting light having the same wave length as that being emitted by the crystal. Typically, this is in the range of 200-700 nm. Unfortunately, the powder has a tendency to pack or shift in the housing, resulting in uneven thickness and density, and non-uniformity in the reflectance characteristics of the powder. Wrapping the crystal with reflective substances is deficient in that it is labor intensive and time consuming.

U.S. Pat. No. 4,107,534 describes coating the entire surface, except for the face plate, of a photomultiplier tube with a layer of highly reflective material such as titanium dioxide in a lacquer base. This improves the light collection efficiency and energy resolution of the PMT.

U.S. Pat. No. 4,110,621 describes coating the surfaces of scintillation crystals such as sodium iodide, bismuth germanate, cesium fluoride and thallium activated cesium iodide with a highly reflective matte layer of a material such as magnesium oxide, calcium carbonate, barium sulfate, or titanium dioxide to a thickness of approximately 0.5 millimeters. The crystal is coupled to the window of a PIN silicon photodiode.

U.S. Pat. No. 4,267,453 describes the use of barium sulfate in acrylic varnish, diluted with a diluent such as spirits and xylene. The material is applied to the surface of a scintillation crystal to provide an adherent reflective layer.

THE SUMMARY OF THE INVENTION

The invention relates to the use of an adherent reflective layer on the exposed surfaces of a scintillator, more particularly an inorganic scintillation crystal, said layer containing particles of a first material such as barium sulfate and a second material such as titanium dioxide. The reflective layer reduces the escape or loss of scintillation events before they are noted by the detector associated with the crystal.

As compared to prior art reflective coatings, the use of this novel coating has the following advantages:

(a) It specifically reflects scintillation events in the range of 200-700 nm and thus, is usable on a wide range of scintillators including plastic scintillators and inorganic scintillation crystals.

(b) It utilizes readily available materials that are easy to apply to the scintillator surface.

(c) It eliminates the inconveniences and drawbacks associated with the use of reflective powders packed between a scintillator and its housing.

(d) The application of the material such as titanium dioxide in a binder system securely bonds both the titanium dioxide and the barium sulfate to the surface of the scintillator.

(e) This dual reflective coating improves the pulse height and resolution of the scintillator.

DETAILED DESCRIPTION OF THE INVENTION

The invention relates to a scintillator and more particularly to an inorganic scintillation crystal adapted to be optically coupled to the means for detecting a scintillation event, said crystal improved by a layer reflecting back into the crystal, scintillation events being emitted in the 200-700 nm range, said layer consisting of particles of a first inorganic reflective material and particles of a second inorganic reflective material adhered to the surface of the crystal by the use of a compatible binder.

The invention also comprises the process of providing a reflective layer on the surface of a scintillator comprising applying one or more coatings of particles of a first reflective material to the scintillator surface followed by the application of a coating of a second reflective material in a compatible binder system.

The first reflective material is selected from the group consisting of barium sulfate, magnesium oxide or aluminum oxide. Barium sulfate is the preferred material and is available in commercial form from Eastman Kodak Company as Kodak White Reflectance Coating (Chemical No. 6080). This material has a absolute reflectance of between 0.94 and 0.99 in the region of about 250 nm to 700 nm. The material in finely divided form is available with a suitable binder and solvent, capable, without further preparation, of being sprayed directly on the surface of the scintillator. In addition to being highly reflective, it is completely nonself radiating, has high stability and nearly perfect diffuse reflection. Prior to spraying, it is preferable to heat the Eastman Kodak material to a temperature of approximately 45°-50° C. followed by shaking or agitation to insure that the particles are completely dispersed. For best results, the barium sulfate is applied to the surface by spraying two or more discrete coats, with an intermediate drying step. Each application should apply a coating having a thickness of between 1 and 2 mils. Although spraying is the preferred technique, dipping or other means can be used to apply the coating to the crystal surface. Of course, masking, shielding or other safeguards must be taken to prevent deposition of the barium sulfate on the surface of the scintillator to be optically coupled to the detector.

After application of each coat of barium sulfate, the coating is dried by air drying or by the use of radiant heat.

After the surface of the scintillator has been coated to the desired thickness with the barium sulfate, it is then coated with a second inorganic powder such as $TiO_2$ in a suitable binder such as sodium silicate or acrylic resin. A particularly satisfactory material for this purpose is NE560 sold by Nuclear Enterprises, Inc. This material is a highly efficient reflector having a reflectivity in the range of 95% at wave lengths above 400 nm's. The material is available as a water based emulsion adapted to be applied by spraying, painting or dipping. It is applied directly over the layer of barium sulfate to an additional thickness of 1 to 3 mils. Thus, the final thickness of the combined coating is between about 3 and about 10 mils.

Conventional air spraying equipment can be used to apply the coatings, using compressed air or nitrogen. The use of a small air brush to apply the spray avoids wasteful overspray. Alternatively, airless spraying may be used to apply each of the coatings. As previously mentioned, the coatings may be applied by dipping or by other appropriate means. One simple method of mounting the scintillator for spraying is to place the scintillator face down on a pedestal, adhered to a piece of double faced adhesive tape mounted on the pedestal. The pedestal may be slowly rotated while the spray coatings are being applied.

The invention is applicable and can be used to improve the detection efficiency of a variety of inorganic halides and oxide scintillation crystals as well as plastic scintillators. Although crystals such as NaI(Tl) and CsI(Na) are good scintillators, they also are hygroscopic and cannot readily be coated with the reflective layer of the present invention primarily because water of hydration which forms on the crystal surface impedes formation of a good bond between the reflective layer and the crystal. However, the invention is applicable to a wide variety of inorganic non-hygrosopic halides and oxides. The inorganic and non-hygroscopic halides include $BaF_2$, $CaF_2(Eu)$, $CsI(Tl)$ and $TlCl(Be,I)$. The inorganic oxide crystals are typified by $Bi_4Ge_3O_{12}$, $CaWO_4$ and $CdWO_4$. Unquestionably, the reflective layer of the present invention can be applied to other inorganic halide and oxide scintillation crystals in addition to those specified. Before application of the reflective layer, it is important for the crystal surface to be thoroughly cleaned by suitable means such as alcohol and/or water.

The following example is intended to illustrate a preferred embodiment of the invention.

EXAMPLE I

A $3'' \times 1\frac{1}{2}'' \times 1\frac{3}{4}''$ rectangular bismuth germanate crystal is thoroughly cleaned with methyl alcohol and is placed on a pedestal, using a layer of double faced adhesive tape to adhere the crystal to the pedestal. It is spray coated with three successive layers of barium sulfate (Kodak 6080), each spray step followed by a 15 minute air drying step. The combined thickness of the coating is approximately 4 mils. For each application, the surface is sprayed until it has a wet gleamy uniform appearance. It is found necessary to heat the spray material to a temperature of about 45° C. before spraying. A layer of $TiO_2$ in an acrylic base, available commercially as Craftint $TiO_2$, is then sprayed over the dried barium sulfate layer and is allowed to dry. The total combined thickness of the coating is 7 mils. The coating upon drying is stable and adherent.

A second crystal, similarly sized, is sprayed with three layers of barium sulfate (Kodak 6080) following the above procedure but without the final binder layer of $TiO_2$. Upon drying, the texture of the layer is chalky and powdery and the adhesion is poor.

Each crystal is coupled to a photomultiplier tube, using optical grease, and the pulse height and resolution is measured. The values for the two crystals are nearly identical, and are considerably better than the values of an identical crystal with no reflective coating. Furthermore, the pulse height and resolution are at least 10% better than the values of the same crystal sprayed only with the Craftint $TiO_2$.

We claim:

1. An inorganic scintillation crystal selected from the group consisting of inorganic halides and inorganic oxides, said crystal having one surface optically coupled to a photodetector, and the remaining surfaces coated with a reflective layer, said layer having a thickness in the range of between about 3 and about 10 mils and adapted to internally reflect scintillation events being emitted by the crystal in the light range of 200-700 nanometers, said reflective layer comprising a coating of a first reflective material in contact with the crystal surface and selected from the group consisting of barium sulfate, aluminum oxide and magnesium oxide and a coating of a second reflective material consisting of titanium dioxide bonded to the first reflective coating by use of a compatible binder.

2. The scintillator of claim 1 wherein the compatible binder is sodium silicate.

3. The scintillator of claim 1 wherein the compatible binder is an acrylic resin.

4. The crystal of claim 1 wherein the iroganic halides are selected from the group consisting of $BaF_2$, $CaF_2(Eu)$, $CsI(Tl)$ and $TlCl(Be,I)$.

5. The crystal of claim 1 wherein the oxides are selected from the group consisting of $Bi_4Ge_3O_{12}$, $CaWO_4$, and $CdWO_4$.

6. A process of providing a highly reflective layer of inorganic particles on the surface of an inorganic scintillation crystal selected from the group consisting of inorganic halides and inorganic oxides, comprising covering the crystal surface with one or two coatings of a first reflective material comprising barium sulfate, applying over the barium sulfate a second reflective material comprising titanium dioxide and a binder and drying each coating after application, the combined thickness of the coatings being between about 3 and about 10 mils.

7. The process of claim 6 wherein the coatings are applied to the surface by spraying.

8. The process of claim 6 wherein each coating is deposited to a thickness of between about 1 and about 3 mils.

9. The process of claim 6 wherein the second material is sprayed on the surface with a binder.

10. The process of claim 9 wherein the binder is sodium silicate.

* * * * *